United States Patent
Sun et al.

(10) Patent No.: US 9,228,065 B2
(45) Date of Patent: Jan. 5, 2016

(54) SOLUTION BASED POLYMER NANOFILLER-COMPOSITES SYNTHESIS

(71) Applicants: Li Sun, Houston, TX (US); Anil Pitta, Cypress, TX (US); Hung Duong, Houston, TX (US)

(72) Inventors: Li Sun, Houston, TX (US); Anil Pitta, Cypress, TX (US); Hung Duong, Houston, TX (US)

(73) Assignees: UNIVERSITY OF HOUSTON SYSTEM, Houston, TX (US); VETCO GRAY INC., Houston, TX (US)

( * ) Notice: Subject to any disclaimer, the term of this patent is extended or adjusted under 35 U.S.C. 154(b) by 0 days.

(21) Appl. No.: 14/274,111

(22) Filed: May 9, 2014

(65) Prior Publication Data

US 2014/0336299 A1 Nov. 13, 2014

Related U.S. Application Data

(60) Provisional application No. 61/821,481, filed on May 9, 2013.

(51) Int. Cl.
| | |
|---|---|
| *C08F 2/46* | (2006.01) |
| *C08G 61/04* | (2006.01) |
| *C07F 7/18* | (2006.01) |
| *C08F 8/00* | (2006.01) |
| *C08J 3/215* | (2006.01) |
| *C08J 5/00* | (2006.01) |
| *C08K 7/24* | (2006.01) |

(52) U.S. Cl.
CPC *C08J 3/215* (2013.01); *C08J 5/005* (2013.01); *C08K 7/24* (2013.01); *C08J 2315/00* (2013.01)

(58) Field of Classification Search
CPC ........... C08J 3/203; C08J 2309/02; C08J 3/28
USPC .................. 522/151, 150, 1, 161, 157; 520/1
See application file for complete search history.

(56) References Cited

U.S. PATENT DOCUMENTS

| | | | |
|---|---|---|---|
| 6,652,958 B2 | 11/2003 | Tobita | |
| 6,730,731 B2 | 5/2004 | Tobita et al. | |
| 7,080,998 B2 | 7/2006 | Hall et al. | |
| 7,410,603 B2 | 8/2008 | Noguchi et al. | |
| 7,619,029 B1 | 11/2009 | Noguchi et al. | |
| 7,785,701 B2 | 8/2010 | Noguchi et al. | |
| 7,803,297 B2 | 9/2010 | Magario et al. | |
| 8,053,506 B2 | 11/2011 | Noguchi et al. | |
| 2004/0136894 A1 | 7/2004 | Ypshizawa et al. | |
| 2005/0161212 A1 | 7/2005 | Leismer et al. | |
| 2006/0016522 A1 | 1/2006 | Noguchi et al. | |
| 2006/0057387 A1 | 3/2006 | Magario et al. | |
| 2007/0112124 A1 | 5/2007 | Noguchi et al. | |
| 2007/0259994 A1 | 11/2007 | Tour et al. | |
| 2008/0050259 A1 | 2/2008 | Hooper | |
| 2008/0121436 A1 | 5/2008 | Slay et al. | |
| 2008/0132635 A1 | 6/2008 | Noguchi et al. | |
| 2008/0167417 A1 | 7/2008 | Noguchi et al. | |
| 2009/0152009 A1 | 6/2009 | Slay et al. | |
| 2009/0253852 A1 | 10/2009 | Noguchi et al. | |
| 2010/0009160 A1 | 1/2010 | Noguchi et al. | |
| 2010/0009183 A1 | 1/2010 | Noguchi et al. | |
| 2010/0009204 A1 | 1/2010 | Noguchi et al. | |
| 2010/0015032 A1 | 1/2010 | Magario et al. | |
| 2010/0096597 A1* | 4/2010 | Prud'Homme et al. | 252/511 |
| 2010/0286309 A1 | 11/2010 | Noguchi et al. | |
| 2011/0060087 A1 | 3/2011 | Noguchi et al. | |
| 2011/0139466 A1 | 6/2011 | Chen et al. | |
| 2011/0156355 A1 | 6/2011 | Noguchi et al. | |
| 2011/0156357 A1 | 6/2011 | Noguchi et al. | |
| 2011/0160375 A1 | 6/2011 | Noguchi et al. | |
| 2012/0035309 A1* | 2/2012 | Zhu et al. | 524/296 |
| 2012/0190772 A1* | 7/2012 | Weng et al. | 523/351 |

OTHER PUBLICATIONS

Reuss Convert Durometer to Youngs Modulus Blog 3D Vision Technologies Jul. 14, 2011 on Aug. 20, 2014 Retrieved from internet URL http//blog.3dvision.com/2011/07/14/convert-durometer-to-youngs-modulus/.
Int'l Search Report for PCT/US2014/037480 dated Sep. 16, 2014.

* cited by examiner

*Primary Examiner* — Ling Choi
*Assistant Examiner* — Jessica E Whiteley
(74) *Attorney, Agent, or Firm* — Winstead PC

(57) ABSTRACT

A solution based polymer nanofiller composite processing method to improve mechanical, electrical, thermal and/or chemical properties. The solution based synthesis method may include the steps of surface functionalizing carbon nanomaterials and dissolving a polymer in a solvent. The functionalized carbon nanomaterials and dissolved polymer may be mixed until the mixture is homogenous. The mixture may be cured to form the polymer carbon nano-composite material, which provides significant improvements in modulus, hardness, strength, fracture toughness, wear, fatigue, creep, and damping performance.

20 Claims, 1 Drawing Sheet

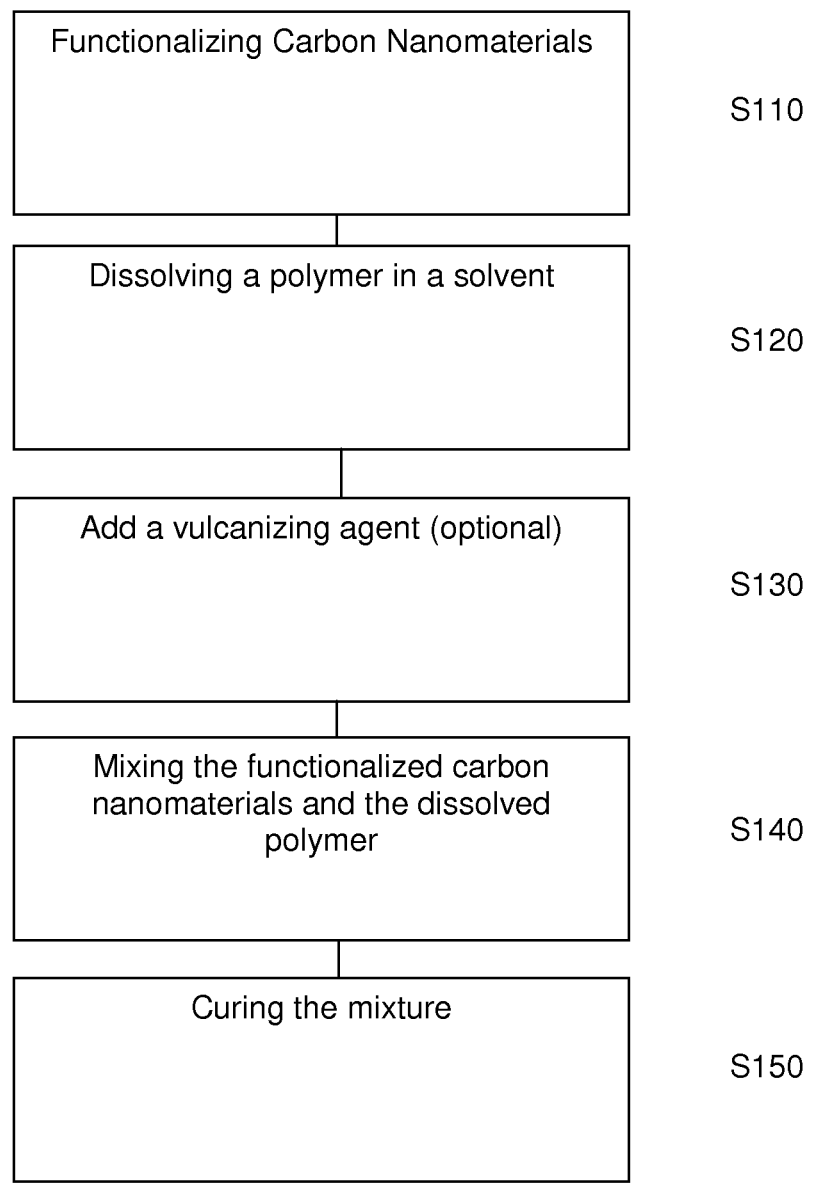

SOLUTION BASED POLYMER NANOFILLER-COMPOSITES SYNTHESIS

RELATED APPLICATIONS

This application claims the benefit of U.S. Provisional Patent Application No. 61/821,481, filed on May 9, 2013, which is incorporated herein by reference.

FIELD OF THE INVENTION

This invention relates to systems and method for synthesis of polymer nanofiller-composites.

BACKGROUND OF INVENTION

The reinforcement of polymers with nano-materials can greatly improve the mechanical and also the chemical/thermal stability of polymeric materials. Production of polymer composite materials and components is a process of great practical and technological importance. High quality polymer nano-composite materials show significant elastic modulus, hardness, strength, tear strength, fracture toughness and wear performances. Available elastomer composite products may be manufactured from carbon black/silica filled amorphous rubbery raw materials. For example, un-vulcanized rubber, carbon black/silica and vulcanizing agents may be mixed, followed by molding and curing under high temperature and high pressure. To further improve polymer composite performance, nanomaterials other than carbon black, such as the carbon nanotubes (CNTs), carbon nanofibers (CNFs), nanoclays, and other nanoparticles, may be mixed with a polymer.

Rubber composite fabrication may utilize mechanical mixing of fillers and curing compounds together with rubber matrix, which can result in dispersion uniformity problems, especially for non-spherical fillers such as CNTs and CNFs. It is understood that controlling nanomaterial dispersion and interfacial bonding strength are two of the most important issues that need to be addressed before polymer carbon composite products can be reliably produced. Due to viscoelasticity of polymer matrices and the small sized of the nanofillers, mechanical mixing can be ineffective and often result in poor filler dispersion in the polymer matrix, especially when the filler concentration reaches the percolation threshold.

Methods and systems for producing polymer nanofiller composite materials are discussed herein. The methods and systems overcome the challenges in mixing multi-scale materials by direct mechanical blending, and utilize a reliable solution based approach to synthesizing the carbon nano-composite materials.

SUMMARY OF THE INVENTION

In some embodiments, a solution based polymer carbon nano-composite synthesis method may include the steps of surface functionalizing carbon nanomaterials and dissolving a polymer in a solvent. The functionalized carbon nanomaterials and dissolved polymer may be mixed until the mixture is homogenous. The mixture may be cured to form the polymer carbon nano-composite material, which provides significant improvements in modulus, hardness, strength, tear strength, fracture toughness and wear performance. In some embodiments, a vulcanizing agent may optionally be utilized with the mixture of functionalized carbon nanomaterials and dissolved polymer.

In some embodiments, a solution based polymer carbon nano-composite may comprise a polymer and carbon nanomaterials dispersed within the polymer, wherein the carbon nanomaterials are dispersed within the polymer utilizing a solution based approach, with nanofillers uniformly distributed in the polymeric matrices.

The foregoing has outlined rather broadly various features of the present disclosure in order that the detailed description that follows may be better understood. Additional features and advantages of the disclosure will be described hereinafter.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein:

FIG. 1 is an illustrative implementation of a solution based approach for synthesizing a polymer carbon nano-composite.

DETAILED DESCRIPTION

Refer now to the drawings wherein depicted elements are not necessarily shown to scale and wherein like or similar elements are designated by the same reference numeral through the several views.

Referring to the drawings in general, it will be understood that the illustrations are for the purpose of describing particular implementations of the disclosure and are not intended to be limiting thereto. While most of the terms used herein will be recognizable to those of ordinary skill in the art, it should be understood that when not explicitly defined, terms should be interpreted as adopting a meaning presently accepted by those of ordinary skill in the art.

It is to be understood that both the foregoing general description and the following detailed description are exemplary and explanatory only, and are not restrictive of the invention, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

Systems and methods for the synthesis of polymer nanofiller/nanomaterial composites are discussed herein. The systems and methods utilize a solution based approach to synthesis of polymer carbon nano-composites. Carbon nanofillers or nanomaterials may be functionalized to provide a desired chemical group on its surface that aids the dispersion and chemical bonding with a polymer. The nanofillers/nanomaterials may be mixed with a dissolved polymer to form a homogeneous mixture, and if necessary, a solvent may be removed.

A nanofiller or nanomaterial as discussed herein may be a nanotube, buckyball, nanofiber, layered nanostructures, nanoparticles or other nanosized structures comprised of carbon and/or other chemical compositions. Nonlimiting examples of carbon nanomaterials may include carbon nanotubes (CNTs), carbon nanofibers (CNFs), nanoclays, buckyballs, or other carbon nanoparticles. A polymer nanofiller or nanomaterial composite as discussed herein may comprise a carbon nanostructure and a polymer. In some embodiments, the polymer may be any suitable elastomer, such as, but not limited to, Nitrile Butadiene Rubber (NBR) and Hydrogenated Nitrile Butadiene Rubber (HNBR). Other examples include, but are not limited to, rubbers, polymers (e g, homopolymers, copolymers and/or terpolymers) of 1,3-butadiene, styrene, isoprene, isobutylene, 2,3-dimethyl-1,3-butadiene, acrylonitrile, ethylene, propylene and the like, styrene-butadiene rubber (SBR), natural rubber and its derivatives such as chlorinated rubber, polybutadiene, natural polyisoprene, synthetic polyisoprene, Polybutadiene, Chloropene rubber, Butyl rubber, Halogenated butyl rubbers, Styrene-butadiene Rubber, poly(stryene-co-butadiene) and the oil extended derivatives of any of them blends.

Any of the foregoing may also be used. Particular suitable synthetic polymers include: copolymers of conjugated dienes such as polybutadiene, polyisoprene, polychloroprene, and the like, and copolymers of such conjugated dienes with an ethylenic group-containing monomer copolymerizable therewith such as styrene, methyl styrene, chlorostyrene, acrylonitrile, 2-vinyl-pyridine, 5-methyl-2-vinylpyridine, 5-ethyl-2-vinylpyridine, 2-methyl-5-vinylpyridine, alkyl-substituted acrylates, vinyl ketone, methyl isopropenyl ketone, methyl vinyl either, alphamethylene carboxylic acids and the esters and amides thereof such as acrylic acid and dialkylacrylic acid amide. Also suitable for use herein are copolymers of ethylene and other high alpha olefins such as propylene, butene-1 and pentene. Further, the polymer nanofiller composite may contain, in addition to the polymer and filler, curing agents, a coupling agent, and optionally, various processing aids, oil extenders and antidegradents.

As discussed previously, the reinforcement of polymers with nanomaterials can greatly improve the mechanical and chemical/thermal stability of polymeric materials. For example, elastomers may be mixed with carbon black/silica and cured to improve polymer performance. Further, nanomaterials other than carbon black, such as the carbon nanotubes, carbon nanofibers, nanoclays, and other nanoparticles are suggested to improve performance. However, it is widely recognized that control of the nanomaterials dispersion and interfacial bonding strength are two of the most important issues that need to be addressed before reliable and reproducible products can be developed. Due to viscoelasticity of polymer matrix and the small sized of the nanofillers, mechanical mixing often result in poor nanofiller dispersion, especially with increasing nanofiller concentration.

In the systems and methods discussed herein, polymeric matrices, nanofillers/nanomaterials and curing chemicals are processed in suitable solvents for improved dispersion and mixing for composite production. In some embodiments, the solvents may be the same, whereas in other embodiments, the solvents may be different. In some embodiments, functionalization of the carbon nanomaterials may be performed by reacting carbon nanomaterials with oxidizing agents, including but not limited to nitric acid, sulfuric acid, a mixture of sulfuric acid and nitric acid, ozone, hydrogen peroxide, or combinations thereof. The functionalization may introduce functional groups including but not limited to —OH, —COH, —COOH, or combinations thereof, which may improve chemical bonding between the carbon nanomaterials and the polymer. In some embodiments, the polymer may be dissolved in any compatible solvent, such as but not limited to acetone, chloroform, toluene, aromatic hydrocarbon solvents, or the like. This solution based process overcomes the challenges in mixing multi-scale materials by direct mechanical blending, such as used in solid state rubber composite production.

Polymers utilized in the process may provide high elastic modulus, hardness, strength, tear strength, fracture toughness and/or wear performance. Also, thermal and electrical conductivity of the matrix can be enhanced. In some embodiments, the polymer may be an elastomer, such as NBR, HNBR, Natural polyisoprene, Synthetic polyisoprene, Polybutadiene, Chloropene rubber, Butyl rubber, Halogenated butyl rubbers, Styrene-butadiene Rubber, or any other polymeric materials. Non-limiting examples of the carbon nanomaterials may include single walled carbon nanotubes (SWNT), multiwalled carbon nanotubes (MWNT), carbon nanofibers, graphene, or other carbon nanoparticles. Carbon nanomaterials may be much more effective in rubber performance enhancement than traditional fillers due to their high aspect ratio, anisotropy and intrinsic physiochemical properties.

In some embodiments, a solution based polymer carbon nano-composite may comprise a polymer and carbon nanomaterials dispersed within the polymer, wherein the carbon nanomaterials are dispersed within the polymer utilizing a solution based approach, with nanofillers uniformly distributed in the polymeric matrices. The polymer carbon nano-composite comprises equal to or between 1-30 wt % of the carbon nanomaterials and equal to or between 70-99 wt % of the polymer. Testing has indicated that such concentrations retain appropriate dispersion. The polymer carbon nano-composite demonstrates a hardness of 65 or greater (Hardness A, pts). The polymer carbon nano-composite demonstrates a modulus at 100% strain of 600 psi or better.

FIG. 1 is an illustrative implementation of a solution based approach for synthesizing a polymer carbon nano-composite. The solution base process may comprise surface functionalization of the carbon nanomaterials in step S110. Functionalization of the carbon nanomaterials may be performed by reacting carbon nanomaterials with oxidizing agents, including but not limited to nitric acid, sulfuric acid, a mixture of sulfuric acid and nitric acid, ozone, hydrogen peroxide, or combinations thereof. The functionalization may introduce functional groups including but not limited to —OH, —COH, —COOH, or combinations thereof, which may allow more chemical bonding between the carbon nanomaterials and the polymer.

The polymer may be dissolved in any compatible solvent in step S120. For example, NBR or HNBR may be dissolved in acetone or chloroform. While step S120 occurs after step S110, in other embodiments, the order of these steps can be switched. The dissolved polymer and the pristine or surface functionalized carbon nanomaterials may be mixed or blended to obtain a homogenous mixture in step S140. In some embodiments, a vulcanizing agent may also be added in step S130, such as with the polymer and/or functionalized carbon nanomaterials. Next, the mixture may be subjected to curing in step S150, which may be achieved in various manners depending on the materials in the mixture, such as but not limited to UV radiation, electron beams, heat, chemical additives, sulfur, sulfur donors, activators, accelerators, peroxides, and other systems used to effect vulcanization of the elastomer composition may be used. During the curing step, the mixture may also be molded into a desired shape, such as, but not limited to, molded into the shape of a seal or hose. As a nonlimiting example, the excess solvent may be removed, such as with a heat flux set up that may be allow for recycling of the solvent. When a vulcanizing agent is utilized, the polymer carbon nano-composite may be subject to any suitable vulcanizing process, such as adding sulfur, peroxides, urethane crosslinkers, metallic oxides, acetoxysilane, other curatives, and/or accelerators. In that regard, it should be understood that the polymer nanofiller composite disclosed herein may include vulcanized compositions (VR), thermoplastic vulcanizates (TPV), thermoplastic elastomers (TPE) and thermoplastic polyolefins (TPO). TPV, TPE, and TPO materials that are further classified by their ability to be extruded and molded several times without substantial change of performance characteristics.

Synthesis of such polymer carbon nano-composite materials have shown significant modulus, hardness, strength, tear strength, fracture toughness and wear performances. Thermal and electrical conductivity enhancements have also been realized. Current rubber based composite used in seal applications for the oil and gas industries normally uses carbon black or short carbon fibers with micron size diameter to improve the material hardness, modulus, tensile strength and chemical stabilities. Studies on using nano scale fillers show significant performance enhancements over the traditional fillers; however, nanomaterial dispersion and interfacial bonding strength issues may cause such seals to fail prematurely. This solution based approach overcomes the material dispersion and interfacial bonding strength issued encountered in mechanical mixing. In a nonlimiting embodiment, the polymer carbon nano-composite materials may be utilized for sealing applications in the oil and gas industry. For example, a carbon nanofiber (CNF) HNBR composite prepared in accordance with the solution based synthesis discussed herein can be used for sealing components under high pressure, high temperature, corrosive environments, especially sealing of downhole apparatus in oil and gas industry.

EXPERIMENTAL EXAMPLE

The following examples are included to demonstrate particular aspects of the present disclosure. It should be appreciated by those of ordinary skill in the art that the methods described in the examples that follow merely represent illustrative embodiments of the disclosure. Those of ordinary skill in the art should, in light of the present disclosure, appreciate that many changes can be made in the specific embodiments described and still obtain a like or similar result without departing from the spirit and scope of the present disclosure.

Carbon Nano-fibers (CNFs) were functionalized using a mixture of nitric acid and sulfuric acid to create —COH and —COOH groups on the carbon fiber surface. Acetone and/or chloroform were utilized to dissolve rubber, and the rubber solution, functionalized CNFs and vulcanizing agents were mixed to obtain homogeneous mixture. Solvent was removed by heating and/or vacuum, and a higher vulcanizing temperature was applied to obtain CNFs reinforced rubber. All solvent can be recycled through a heat flux set up.

Initial tests on two batches of HNBR-CNF composites with 1 wt % and 10 wt % CNF showed significantly improved static mechanical performances in comparison to the carbon black reinforced HNBR. In the current synthesis approach, the curing compound can also be added in the liquid phase to further simplify the manufacturing process and improve product performance. This solution based approach can also be extended to other polymer nanofiller-composite synthesis involving different matrix materials and fillers.

Preliminary testing results showed that the hardness of carbon nanofiber reinforced HNBR increases 14%, and the modulus at 100% strain increases 172% compared to carbon black/silica reinforced HNBR with the same load (10 wt. %). The modulus of HBNR with the carbon nanofiber load of 10 wt. % is also 41% higher than the double loaded (20 wt. %) carbon black reinforced HNBR.

TABLE I

| Properties | No filler | 10 phr carbon black | 20 phr carbon black | 10 phr carbon nanofiber Untreated | 10 phr carbon nanofiber Acid-treated | 30 phr carbon nanofiber Untreated |
|---|---|---|---|---|---|---|
| Cure Conditions | 320° F. @ 25 min | 320° F. @ 25 min | 320° F. @ 25 min | 320° F. @ 25 min | 320° F. @ 25 min | 320° F. @ 25 min |
| Hardness A, (pts) | 52 | 57 | 67 | 65 | 66 | 75 |
| Modulus @ 100%, (psi) | 160 | 221 | 426 | 601 | 632 | 1147 |

Embodiments described herein are included to demonstrate particular aspects of the present disclosure. It should be appreciated by those of skill in the art that the embodiments described herein merely represent exemplary embodiments of the disclosure. Those of ordinary skill in the art should, in light of the present disclosure, appreciate that many changes can be made in the specific embodiments described and still obtain a like or similar result without departing from the spirit and scope of the present disclosure. From the foregoing description, one of ordinary skill in the art can easily ascertain the essential characteristics of this disclosure, and without departing from the spirit and scope thereof, can make various changes and modifications to adapt the disclosure to various usages and conditions. The embodiments described hereinabove are meant to be illustrative only and should not be taken as limiting of the scope of the disclosure.

What is claimed is:

1. A method for forming a polymer nanofiller composite, the method comprising:
   functionalizing carbon nanomaterials to form a first nanofiller solution, wherein the functionalizing of the carbon nanomaterials improves chemical bonding between the carbon nanomaterials and a polymer, and the carbon nanomaterials are carbon nanotubes (CNTs), carbon nanofibers (CNFs), or buckyballs;
   dissolving the polymer in a solvent to form a second polymer solution, wherein the second polymer solution consist of the polymer and solvent or the polymer, solvent, and one or more vulcanizing agent;
   mixing the first nanofiller solution and the second polymer solution to form a homogeneous mixture; and
   adding the one or more vulcanizing agent to the first nanofiller solution, the second polymer solution, or during the mixing step.

2. The method of claim 1, further comprising curing the homogeneous mixture to form the polymer nanofiller composite.

3. The method of claim 1, wherein the polymer is Nitrile Butadiene Rubber (NBR), Hydrogenated Nitrile Butadiene Rubber (HNBR), Natural polyisoprene, Synthetic polyisoprene, Polybutadiene, Chloropene rubber, Butyl rubber, Halogenated butyl rubbers, or Styrene-butadiene Rubber.

4. The method of claim 1, wherein the carbon nanomaterials are functionalized in an oxidizing agent.

5. The method of claim 4, wherein the oxidizing agent is nitric acid, sulfuric acid, a mixture of sulfuric acid and nitric acid, ozone, or hydrogen peroxide.

6. The method of claim 4, wherein functional groups of the carbon nanomaterials are —OH, —COH, or —COOH.

7. The method of claim 2, wherein the curing is performed utilizing UV radiation, electron beams, heat, or chemical additives.

8. The method of claim 2, wherein the curing is performed utilizing a vulcanizing process.

9. The method of claim 8, wherein the vulcanizing process is performed by adding sulfur, peroxides, urethane crosslinkers, metallic oxides, acetoxysilane, curatives, and/or accelerators.

10. The method of claim 1, wherein the carbon nanomaterials are carbon nano-fibers (CNFs), the CNFs are functionalized using nitric acid and sulfuric acid to create —COH and —COOH groups, and the polymer is rubber and the solvent is acetone and/or chloroform.

11. A method for forming a polymer nanofiller composite seal, the method comprising:
functionalizing carbon nanomaterials to form a first nanofiller solution, wherein the functionalizing of the carbon nanomaterials improves chemical bonding between the carbon nanomaterials and a polymer, and the carbon nanomaterials are carbon nanotubes (CNTs), carbon nanofibers (CNFs), or buckyballs;
dissolving the polymer in a solvent to form a second polymer solution, wherein the second polymer solution consist of the polymer and solvent or the polymer, solvent, and one or more vulcanizing agent;
mixing the first nanofiller solution and the second polymer solution to form a homogeneous mixture; and
curing and molding the homogeneous mixture to form a polymer nanofiller composite seal.

12. The method of claim 11, further comprising adding a vulcanizing agent the first nanofiller solution, second polymer solution, or during the mixing step.

13. The method of claim 11, wherein the carbon nanomaterials are carbon nanotubes (CNTs), carbon nanofibers (CNFs), nanoclays, or buckyballs.

14. The method of claim 11, wherein the polymer is Nitrile Butadiene Rubber (NBR), Hydrogenated Nitrile Butadiene Rubber (HNBR), Natural polyisoprene, Synthetic polyisoprene, Polybutadiene, Chloropene rubber, Butyl rubber, Halogenated butyl rubbers, or Styrene-butadiene Rubber.

15. The method of claim 11, wherein the carbon nanomaterials are functionalized in an oxidizing agent including nitric acid, sulfuric acid, a mixture of sulfuric acid and nitric acid, or hydrogen peroxide.

16. The method of claim 11, wherein the curing is performed utilizing UV radiation, electron beams, heat, or chemical additives.

17. The method of claim 11, wherein the curing is performed utilizing a vulcanizing process performed by adding sulfur, peroxides, urethane crosslinkers, metallic oxides, acetoxysilane, curatives, and/or accelerators.

18. The method of claim 11, wherein the carbon nanomaterials are carbon nano-fibers (CNFs), the CNFs are functionalized using nitric acid and sulfuric acid to create —COH and —COOH groups, and the polymer is rubber and the solvent is acetone and/or chloroform.

19. The method of claim 1, further comprising removing excess of the solvent with a heat flux set up, wherein removal of the solvent allows for recycling.

20. The method of claim 1, wherein the polymer nanofiller composite comprises equal to or between 1-30 wt % of the carbon nanomaterials and equal to or between 70-99 wt % of the polymer.

* * * * *